(12) United States Patent
Shen

(10) Patent No.: US 9,073,492 B1
(45) Date of Patent: Jul. 7, 2015

(54) ADJUSTABLE BICYCLE CARRIER

(71) Applicant: Jason Shih Chieh Shen, Taichung (TW)

(72) Inventor: Jason Shih Chieh Shen, Taichung (TW)

( * ) Notice: Subject to any disclaimer, the term of this patent is extended or adjusted under 35 U.S.C. 154(b) by 33 days.

(21) Appl. No.: 14/153,198

(22) Filed: Jan. 13, 2014

(51) Int. Cl.
*B60R 9/10* (2006.01)
*B62H 3/04* (2006.01)
*B60R 9/048* (2006.01)

(52) U.S. Cl.
CPC .. *B60R 9/10* (2013.01); *B62H 3/04* (2013.01); *B60R 9/048* (2013.01); *Y10S 224/924* (2013.01)

(58) Field of Classification Search
CPC ............ B60R 9/10; B60R 9/06; B60R 9/048; Y10S 224/924
USPC ......... 224/315, 319, 321, 323, 324, 924, 501, 224/509, 533, 536
See application file for complete search history.

(56) References Cited

U.S. PATENT DOCUMENTS

| | | | |
|---|---|---|---|
| 6,523,731 B1 * | 2/2003 | Pedrini | 224/537 |
| 7,044,347 B1 * | 5/2006 | Pedrini | 224/501 |
| 7,815,084 B2 * | 10/2010 | Allen et al. | 224/537 |
| 8,113,398 B2 * | 2/2012 | Sautter et al. | 224/497 |
| 8,640,888 B2 * | 2/2014 | Liu | 211/17 |
| 2003/0071097 A1 * | 4/2003 | Dean | 224/319 |
| 2005/0284905 A1 * | 12/2005 | Naslund et al. | 224/319 |
| 2007/0000962 A1 * | 1/2007 | Reeves | 224/536 |
| 2007/0164065 A1 * | 7/2007 | Davis | 224/324 |
| 2008/0073395 A1 * | 3/2008 | Reeves et al. | 224/324 |
| 2011/0132946 A1 * | 6/2011 | Sautter et al. | 224/324 |

* cited by examiner

*Primary Examiner* — Brian D Nash
*Assistant Examiner* — Corey Skurdal
(74) *Attorney, Agent, or Firm* — Rosenberg, Klein & Lee

(57) ABSTRACT

An adjustable bicycle carrier contains a base; a first mounting rack including an inner rod and an outer rod, and the inner rod having a retaining seat; a rotatable adjusting device including a rotating member a pawl wheel, a rotatable adjustment knob partially, a steel cable and a first resilient element. The steel cable has a first end disposed on an inner peripheral side of the inner rod and a second end mounted on the rotating member. The adjustable bicycle carrier also contains a locking device including a swing arm, and the swing arm having a fixing mount secured on a predetermined portion thereof, wherein the positioning block and the fixing mount simultaneously swing with the swing arm, the fixing mount has a teeth portion for engaging with the pawl wheel, such that when the swing arm swings, the pawl wheel engages with or disengages from the toothed portion.

11 Claims, 9 Drawing Sheets

ADJUSTABLE BICYCLE CARRIER

FIELD OF THE INVENTION

The present invention relates to an adjustable bicycle carrier which is fixed on a roof of an automobile so as to lock two bicycle wheels easily.

BACKGROUND OF THE INVENTION

Conventional bicycle carrier is fixed on a roof or a trail of an automobile, i.e., the bicycle carrier is fixed on the roof of the automobile so as to lock a bicycle, or the bicycle carrier is fixed on the trail of the automobile so as to hang the bicycle.

When the bicycle carrier is fixed on the roof of the automobile, it can lock a front fork, a bicycle frame or two bicycle wheels of the bicycle. For example, the bicycle carrier is served to lock the front fork of the bicycle, a front one of the two bicycle wheels is removed so that the front fork is locked on the bicycle; the bicycle carrier is applied to lock the bicycle frame, and it has a clamping structure so as to hook a top tube of the bicycle, and then the two bicycle wheels are locked; or the bicycle carrier is used to lock the two bicycle wheels.

TW Patent No. 101136341 discloses that a conventional bicycle carrier for locking a front fork of a bicycle is fixed on a roof of an automobile and contains: a first rack having a first horizontal rod and a first holder connecting with the first horizontal rod; a second rack having a connecting member, a second horizontal rod, and a second holder, wherein the connecting member couples with the first holder, and the second horizontal rod rotatably joins with the connecting member, the second holder is in connection with the second horizontal rod, and the connecting member has a first groove and a second groove, wherein the first groove is defined on a top portion of the connecting member, the second groove is formed on a bottom end of the connecting member. The second horizontal rod has a third groove and a fourth groove, wherein the third groove is defined on a top end of the second horizontal rod, and the fourth groove is arranged on a bottom end of the second horizontal rod. The bicycle carrier also contains a fixing mechanism mounted in the second rack; wherein the second horizontal rod drives the second holder to swing between a first position and a second position relative to the connecting member; when the fixing mechanism is away from a seam between the connecting member and the second horizontal rod, the second holder is secured at the first position or the second position. When the second holder is located at the first position, the first holder and the second holder are located at two opposite sides of the second horizontal rod, and when the second holder is located at the second position, the first holder and the second holder are at one side of the second horizontal rod; wherein the fixing mechanism includes a first forcing element slidably disposed in one of the first groove, the second groove, the third groove and the fourth groove, when the second holder is fixed at the first position or the second position, the first forcing element is located on the seam.

TW Utility Model No. 099209061 discloses that a bicycle carrier is fixed on a roof of an automobile and is used to clamp a bicycle frame, the bicycle carrier contains: a base, a sliding rail defined on the base, a support arm mounted on the base; a extending portion having a slidable block fixed in the sliding rail; a forcing device for moving the extending portion to the support arm. along the sliding rail.

TW Patent No. 099118106 discloses an upright bicycle carrier is fixed on a roof of an automobile and is applied to clamp two bicycle wheels. The upright bicycle carrier contains an elongated base having a front portion and a rear portion, a front clamping device connecting with a front portion of the base so as to clamp a first horizontal rod secured on a top end of a bicycle, a first circular hoop structure coupling with the front portion of the base and surrounding around a first axis and parallel to a retracting position of the base, the first circular hoop rotating between using positions for supporting a bicycle wheel, a second circular hoop structure joining with the front portion of the base and surrounding around a second axis and parallel to a retracting position of the base, the second circular hoop rotating between using positions for supporting a bicycle wheel, the second circular hoop structure including a slope component extending upwardly when the second circular hoop structure is located at the retracting position, and a lever extending downwardly when the second circular hoop structure is located at the retracting position, the lever having a pivoting point relative to the second axis, a screw element with a first end portion and a second end portion, the first end portion of the screw element rotatably connecting with the pivoting point of the lever, and the second end portion of the screw element screwing into and extending out of one of orifices of the base, and a handle having a hole in which inner threads are formed so as to screw with outer threads of the screw element, such that when the slope component rotates forward, the outer threads of the screw element expose outside so that the screw element moves backward to a rear portion of the base.

When the bicycle carrier is fixed on the roof of the automobile and is served to lock the two bicycle wheels, the bicycle carrier contains an elongated base disposed on the roof, a first circular hoop and a second circular hoop which are formed in a U shape so as to lock a front one of the two bicycle wheels, and then a rear one of the two bicycle wheels is tied by a fixing element.

However, such a bicycle carrier cannot be applicable for bicycle wheels of varying size. In addition, although the first circular hoop has an adjusting device secured on a middle section of the first circular hoop at a high heightens, so it is difficult for a user to climb up to the roof so as to fix the bicycle on the bicycle carrier. Likewise, the adjusting device does not have a locking device to position a movable rod securely.

The present invention has arisen to mitigate and/or obviate the afore-described disadvantages.

SUMMARY OF THE INVENTION

The primary object of the present invention is to provide an adjustable bicycle carrier which a user mounts a bicycle on the adjustable bicycle carrier and rotatably adjusts a length of a first mounting rack with one hand so as to avoid the first mounting rack falling from the adjustable bicycle carrier, thus obtaining operating safety and convenience.

Secondary object of the present invention is to provide an adjustable bicycle carrier in which the ratchet mechanism is arranged between the rotatable adjusting device and the locking device so as to achieve a driving operation in a first rotating direction and an engaging operation in a second rotating direction with one hand, such that a height of the first mounting rack is adjusted.

Furthermore object of the present invention is to provide an adjustable bicycle carrier in which a ratchet mechanism is arranged between a rotatable adjusting device and a locking device so as to rotate the rotatable adjustment knob with one hand and to adjust the length and the height of the first mounting rack, thus avoiding danger during automatic rotation.

Another object of the present invention is to provide an adjustable bicycle carrier in which an affixing member is fixed securely by contacting a first engagement portion with a second engagement portion so as to enhance locking stability of the adjustable bicycle carrier.

To obtain the above objectives, an adjustable bicycle carrier provided by the present invention contains: a base, a first mounting rack, a rotatable adjusting device, and a locking device.

The base is a housing.

The first mounting rack is rotatably connected with the base and includes an inner rod and an outer rod, the inner rod linearly moves in the outer rod and has a retaining seat mounted on a free end thereof and locking a first portion of each of two bicycle wheels.

The rotatable adjusting device is fixed on a connecting position of the base and the first mounting rack and includes a rotating member coaxially joining with the rotatable adjusting device. The rotatable adjusting device also includes a pawl wheel fitted on one end thereof and synchronously rotating with the rotating member, a rotatable adjustment knob partially extending out of the base and synchronously rotating with the pawl wheel and the rotating member, a steel cable and a first resilient element which are secured in the inner rod and the outer rod. The steel cable has a first end disposed on a predetermined position of an inner peripheral side of the inner rod and a second end mounted on the rotating member, such that the second end of the steel cable rolls on the rotating member and pulls the inner rod linearly to move to the outer rod when the rotating member rotates, the first resilient element is provided to drive the inner rod to move back to an original position after the inner rod linearly moves to the outer rod.

The locking device includes a swing arm, and a first end of the swing arm rotatably connects with a first predetermined position of an inner rim of the base, and a second end of the swing arm couples with a positioning block, the swing arm has a fixing mount secured on a predetermined portion thereof, wherein the positioning block and the fixing mount simultaneously swing with the swing arm, the fixing mount has a teeth portion for engaging with the pawl wheel, such that when the swing arm swings, the pawl wheel engages with or disengages from the toothed portion.

DETAILED DESCRIPTION OF THE PREFERRED EMBODIMENTS

Figure 1:
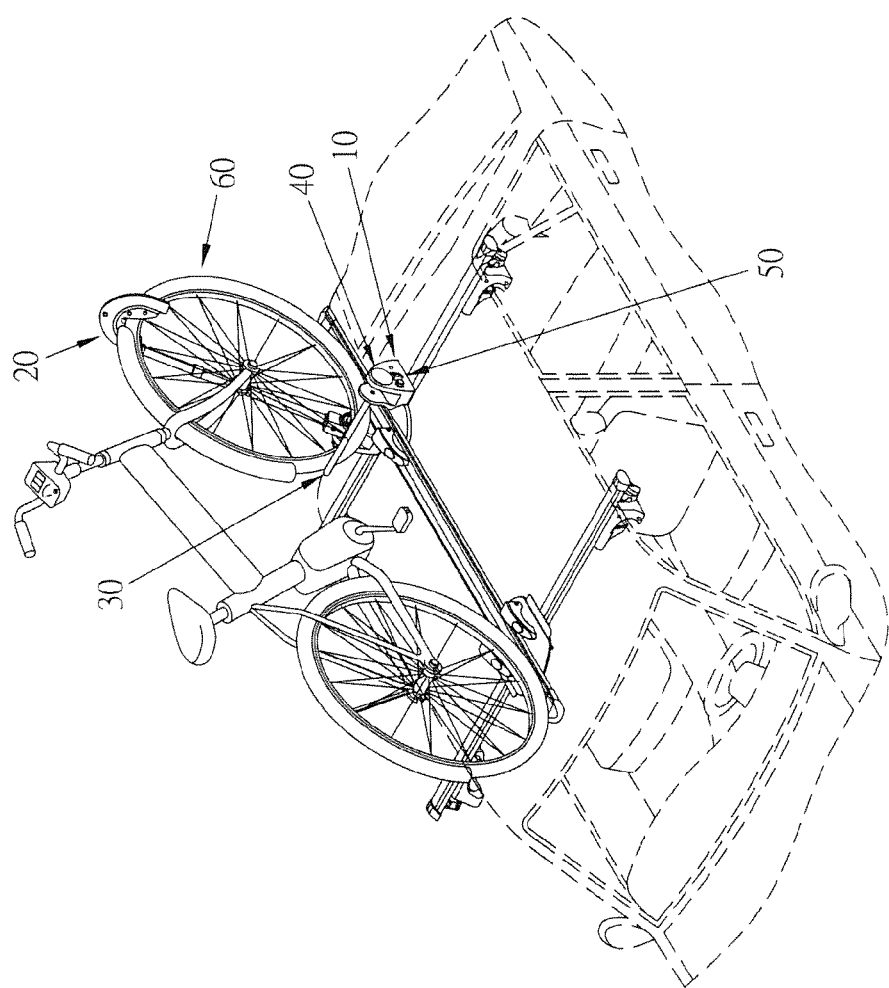
FIG. 1 is a perspective view showing the application of an adjustable bicycle carrier according to a first embodiment of the present invention.
Figure 2:
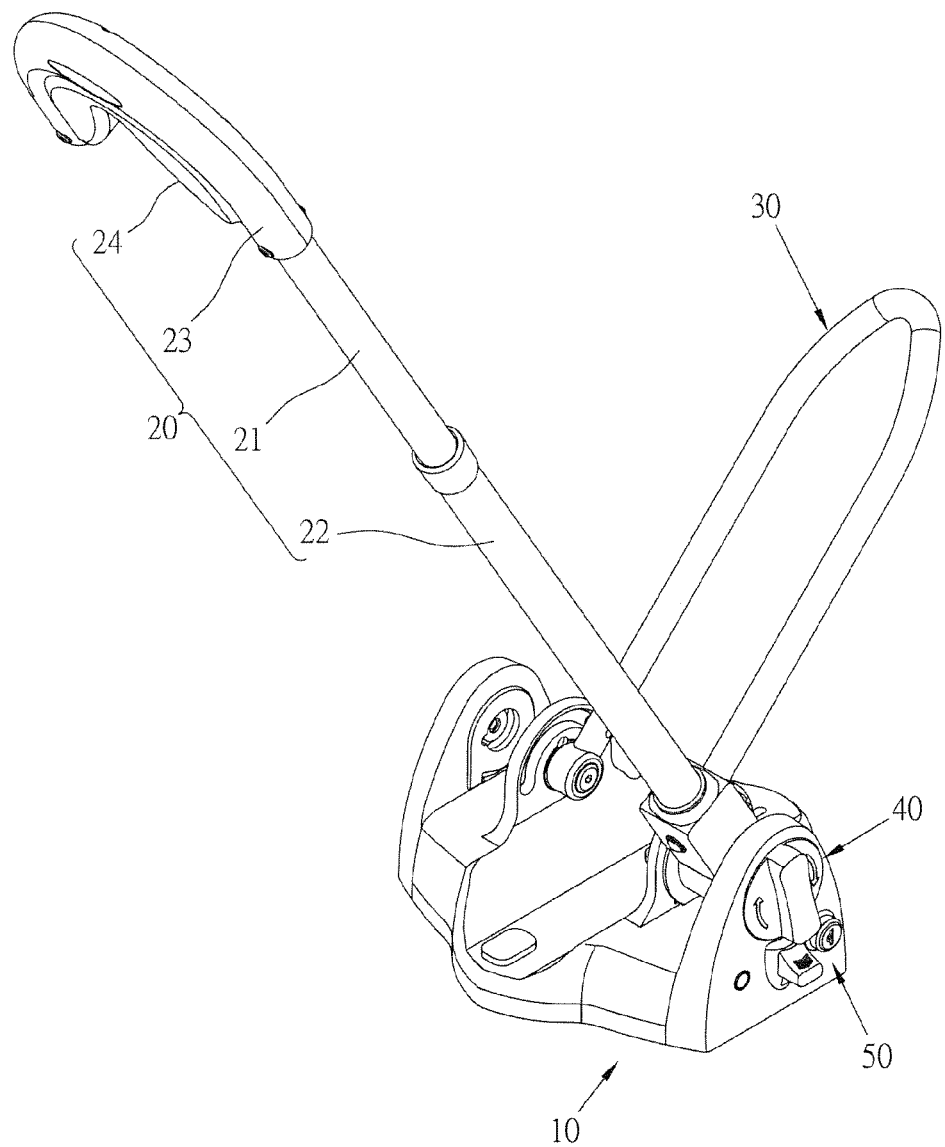
FIG. 2 is a perspective view showing the assembly of the adjustable bicycle carrier according to the first embodiment of the present invention.

Referring further to FIGS. 1-4, an adjustable bicycle carrier according to a first embodiment of the present invention is fixed on a roof of an automobile so as to fix two bicycle wheels 60 and comprises: a base 10, a first mounting rack 20, a second mounting rack 30, a rotatable adjusting device 40, and a locking device 50 which are connected with a left side of the base 10.

The base 10 is a housing.

The first mounting rack 20 is rotatably connected with the base 10 and includes an inner rod 21 and an outer rod 22 which are fitted together so as to form a U-shape first mounting rack, the inner rod 21 linearly moves in the outer rod 22 and has a retaining seat 23 mounted on a free end thereof, and the retaining seat 23 has a V-shaped lock groove 24 defined thereon so as to lock a first portion 61 of each bicycle wheel 60.

The second mounting rack 30 is formed in a U shape and is coupled with the base 10 so as to rotate at a preset angle and to lock a second portion 62 of each bicycle wheel 60. The second mounting rack 30 and the first mounting rack 20 are coaxial and connected with the base 10.

The rotatable adjusting device 40 is fixed on a connecting position of the base 10 and the first mounting rack 20 and includes a rotating member 41 coaxially joining with the rotatable adjusting device 40. The rotatable adjusting device 40 also includes a pawl wheel 42 fitted on one end thereof and synchronously rotating with the rotating member 41; a rotatable adjustment knob 43 partially extending out of the base 10 and synchronously rotating with the pawl wheel 42 and the rotating member 41; a steel cable 44 and a first resilient element 45 which are secured in the inner rod 21 and the outer rod 22, wherein the steel cable 44 has a first end disposed on a predetermined position of an inner peripheral side of the inner rod 21 and a second end mounted on the rotating member 41, such that the second end of the steel cable 44 rolls on the rotating member 41 and pulls the inner rod 21 linearly to move to the outer rod 22 when the rotating member 41 rotates; the first resilient element 45 is provided to drive the inner rod 21 to move back to an original position after the inner rod 21 linearly moves to the outer rod 22; a retaining set 46 defined between the pawl wheel 42 and the rotatable adjustment knob 43 and having a first engaging portion 461 fixed on the rotatable adjustment knob 43 and a second engaging portion 462 secured on the pawl wheel 42 so as to retain with the first engaging portion 461, wherein the first engaging portion 461 has a flange formed in an inverted hook shape; and the second engaging portion 462 is recessed.

The locking device 50 includes a swing arm 51, and a first end of the swing arm 51 rotatably connects with a first predetermined position of an inner rim of the base 10, and a second end of the swing arm 51 couples with a positioning block 52; the swing arm 51 has a fixing mount 53 secured on a predetermined portion thereof, wherein the positioning block 52 and the fixing mount 53 simultaneously swing with the swing arm 51; the fixing mount 53 has a teeth portion 54 for engaging with the pawl wheel 42, such that when the swing arm 51 swings, the pawl wheel 42 engages with or disengages from the toothed portion 54; a predetermined portion of a first side of the fixing mount 53 rotatably joins with the inner rim of the base 10, such that the fixing mount 53 simultaneously swings when the positioning block 52 linearly moves; the fixing mount 53 has a first engagement portion 531 arranged on a second side thereof; the locking device 50 further includes an affixing member 55 rotatably connected on a second predetermined position of the inner rim of the base 10 and rotatably moving; a second engagement portion 551 disposed on a first predetermined position of an outer rim of the affixing member 55 and engaging with the first engagement portion 531; the affixing member 55 has an unlocking portion 552 mounted at a second predetermined position of the outer rim thereof relative to the second engagement portion 551, such that between the second engagement portion 551 and the first engagement portion 531 is defined a gap, and the unlock portion 552 is a flat surface formed by an outer-diameter tangent plane of a circular column of the affixing member 55; a locking orifice 553 exposes outside the base 10 so as to insert a key, such that the key is rotated in the locking orifice 553 so as to drive the affixing member 55 to rotate; a second resilient element 56 is defined between a third predetermined position of the inner rim of the base 10 and the fixing mount 53, such that the fixing mount 53 is driven by the second resilient element 56 to return back to an original position after swinging, and the pawl wheel 42 engages with the toothed portion 54.

Thereby, a ratchet mechanism is arranged between the rotatable adjusting device 40 and the locking device 50, and the locking device 50 has stable locking function and cooperates with the rotatable adjusting device 40 so that a user mounts a bicycle on the adjustable bicycle carrier and rotatably adjusts a length of the first mounting rack 20 with one hand so as to avoid the first mounting rack 20 falling from the adjustable bicycle carrier, thus obtaining operating safety and convenience.

Figure 3:
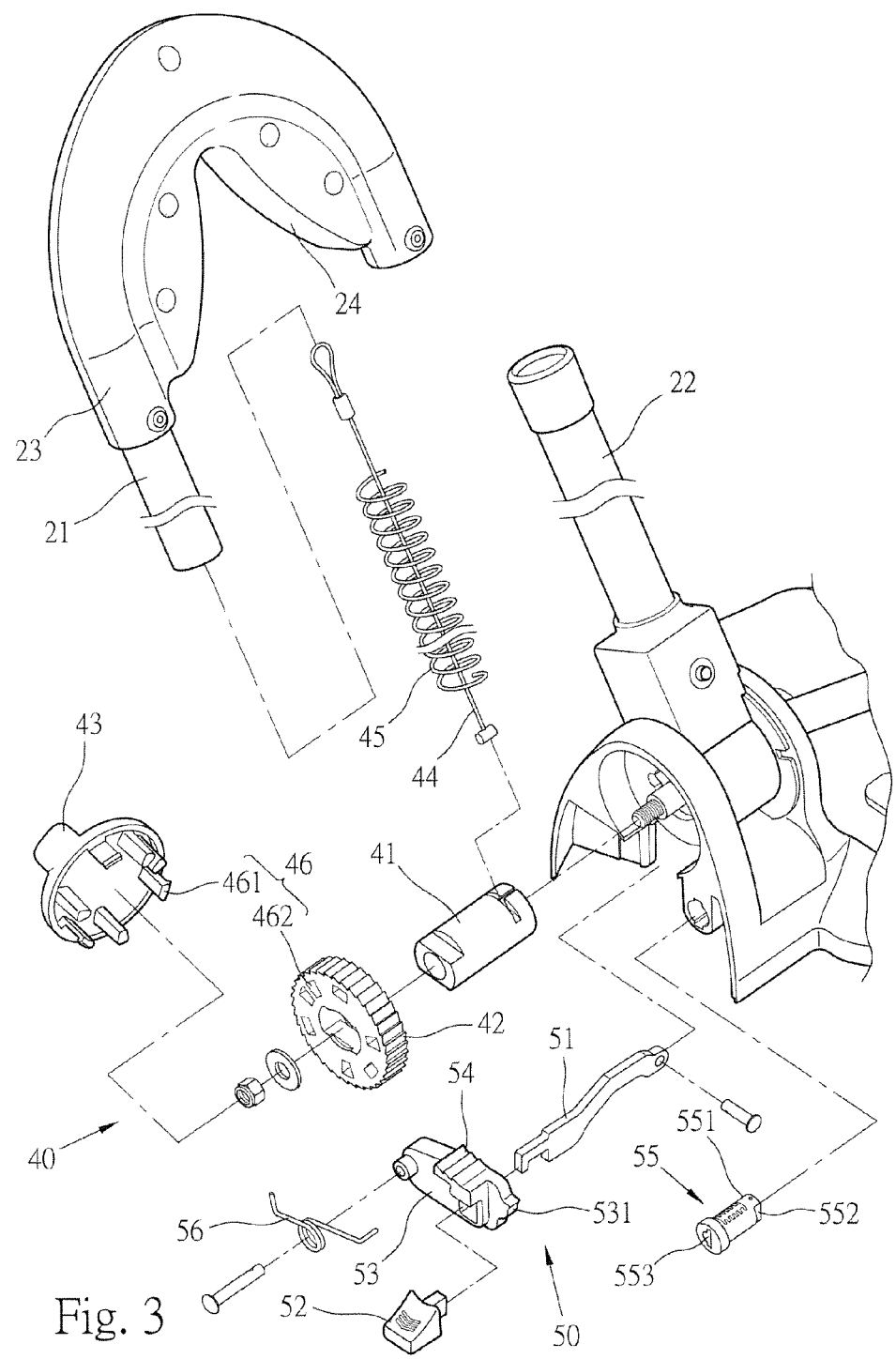
FIG. 3 is a perspective view showing the exploded components of the adjustable bicycle carrier according to the first embodiment of the present invention.
Figure 4:
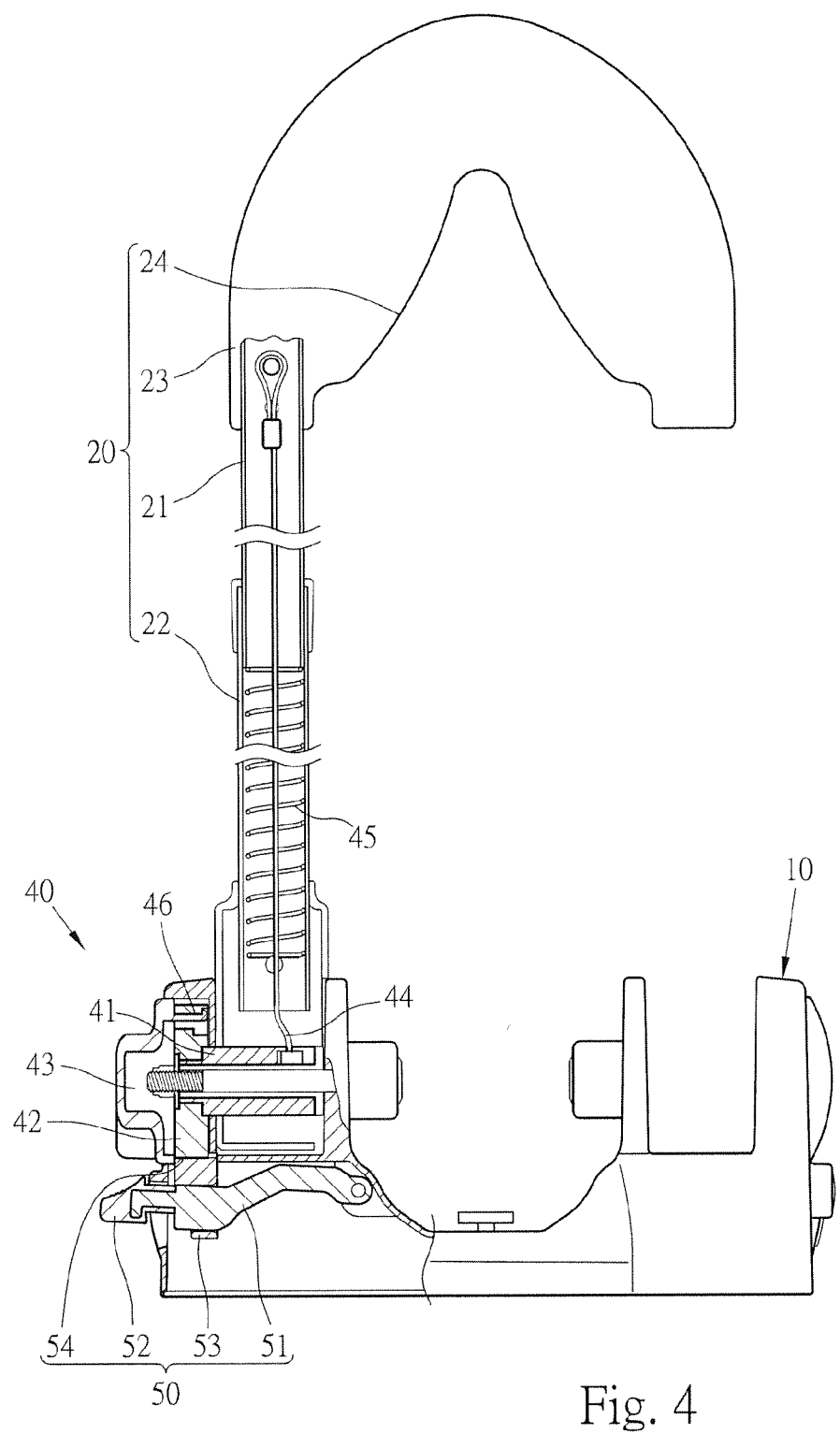
FIG. 4 is a cross sectional view showing the assembly of the adjustable bicycle carrier according to the first embodiment of the present invention.

Referring to FIGS. 3 and 4, in assembly, the first mounting rack 20 and the second mounting rack 30 are coaxially and rotatably connected with the left side of the base 10, and the rotatable adjusting device 40 is coaxially and rotatably coupled with the first mounting rack 20 and the second mounting rack 30, wherein the second end of the steel cable 44 is rolled on the rotating member 41, and the first end of the steel cable 44 is disposed on the inner peripheral side of the inner rod 21, then the first resilient element 45 is secured between the steel cable 44 and the inner rod 21, thereafter pawl wheel 42 is fitted on the rotating member 41, and the rotatable adjustment knob 43 is fixed on the pawl wheel 42, wherein the first engaging portion 461 retains with the second engaging portion 462.

In assembly of the locking device 50, the first end of the swing arm 51 is rotatably connected with the inner rim of the base 10, and the fixing mount 53 is fitted onto a middle section of the swing arm 51, the toothed portion 54 corresponds to outer teeth of the pawl wheel 42; the positioning block 52 is coupled with the second end of the swing arm 51, and the predetermined portion of the first side of the fixing mount 53 is rotatably joined with the inner rim of the base 10; the second resilient element 56 is positioned between the third predetermined position of the inner rim of the base 10 and the fixing mount 53, such that a first end of the second resilient element 56 abuts against the fixing mount 53, and a second end of the second resilient element 56 is biased against the third predetermined position of the inner rim of the base 10. The affixing member 55 is rotatably connected on the second predetermined position of the inner rim of the base 10, and the second engagement portion 551 corresponds to the first engagement portion 531 of the fixing mount 53, the locking orifice 553 of the affixing member 55 exposes outside the base 10.

Figure 6:
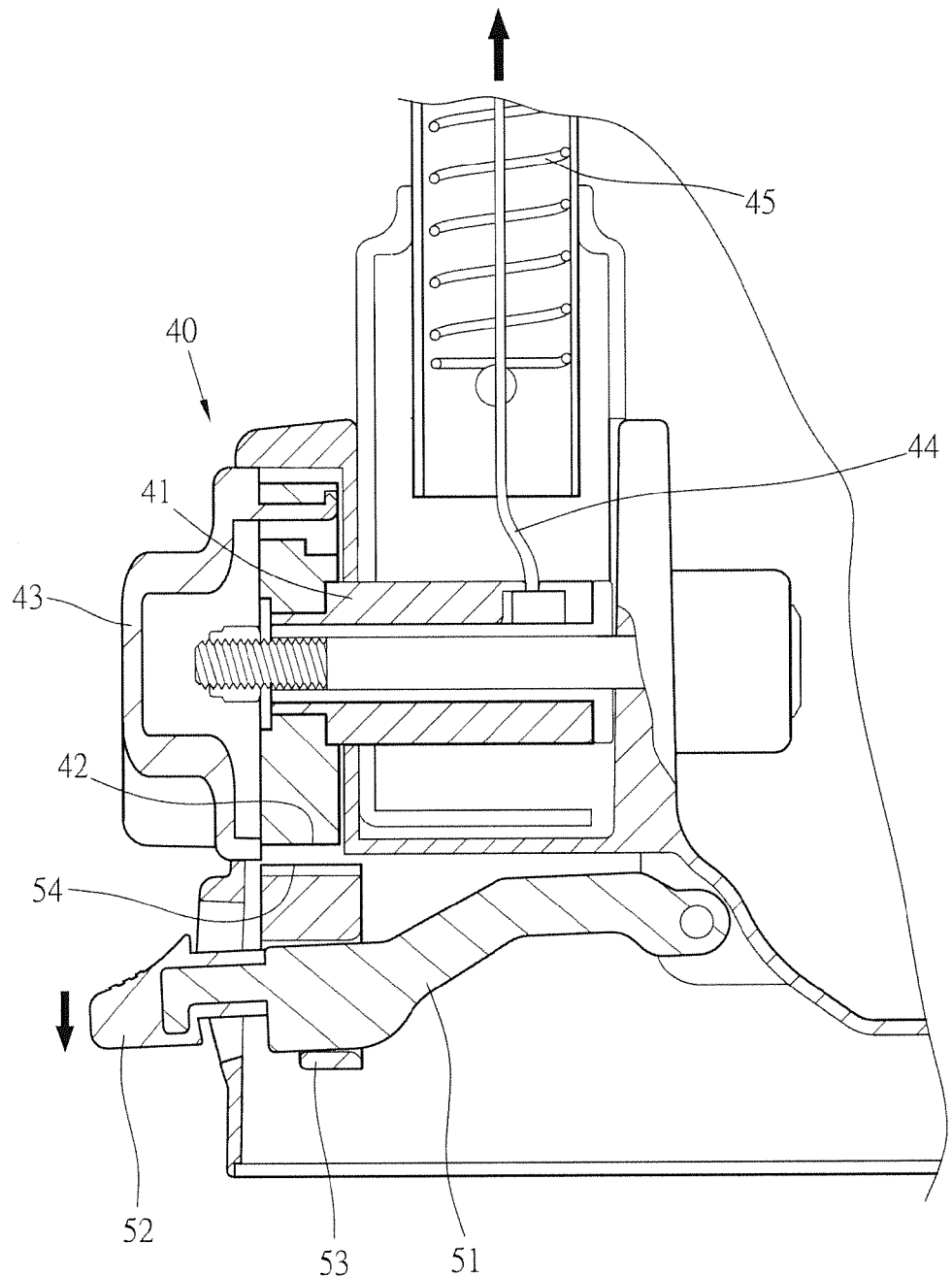
FIG. 6 is another cross sectional view showing the operation of the adjustable bicycle carrier according to the first embodiment of the present invention.

With reference to FIG. 6, as desiring to extend the first mounting rack 20 at a longest length, the positioning block 52 is rotated downwardly, in the meantime, the pawl wheel 42 does not engage with the toothed portion 54, so the pawl wheel 42, the rotatable adjustment knob 43 and the rotating member 41 are not engaged, and then the first resilient element 45 pushes the inner rod 21 outwardly and pulls the steel cable 44 to unroll from the rotating member 41, such that the pawl wheel 42, the rotatable adjustment knob 43 and the rotating member 41 rotate simultaneously until an elasticity of the first resilient element 45 is zero, thus extending the first mounting rack 20 at the longest length.

Thereafter, the bicycle is lifted to a back side of the roof so that each bicycle wheel 60 is locked in the first mounting rack 20 and in the second mounting rack 30 of the base 10, and a bicycle frame is held with one hand, the first mounting rack 20 is rotated by the other hand to a suitable angle, and the positioning block 52 is rotated upwardly so that the pawl wheel 42 engages with the toothed portion 54, thus rotating the rotatable adjustment knob 43 further.

Figure 5:
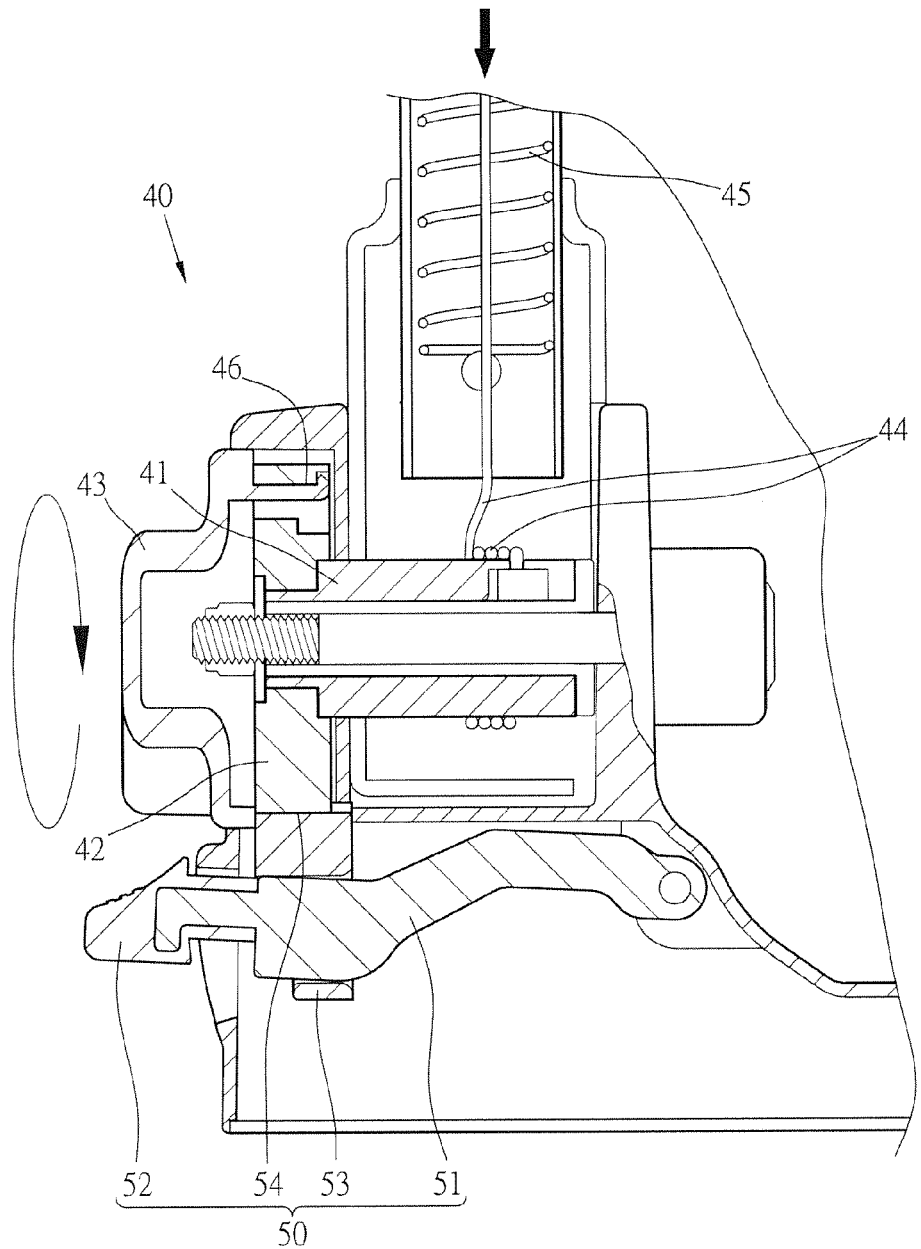
FIG. 5 is a cross sectional view showing the operation of the adjustable bicycle carrier according to the first embodiment of the present invention.

As shown in FIG. 5, the pawl wheel 42, the rotatable adjustment knob 43 and the rotating member 41 rotate simultaneously so that the second end of the steel cable 44 is rolled on the rotating member 41, and the first end of the steel cable 44 pulls the inner rod 21 to linearly move to the outer rod 10 until the lock groove 24 locks each bicycle wheel 60, thereby mounting the bicycle on the adjustable bicycle carrier.

Figure 7:
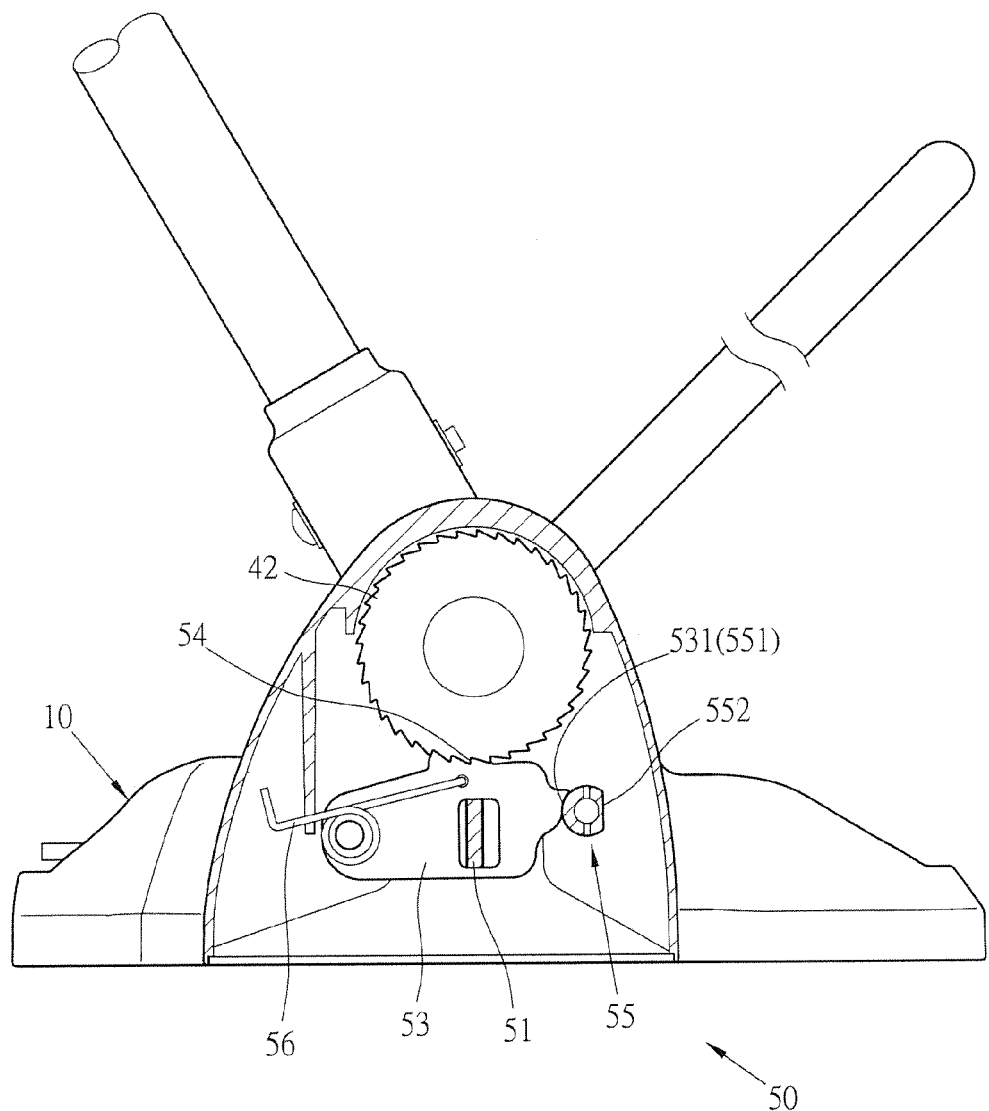
FIG. 7 is also another cross sectional view showing the operation of the adjustable bicycle carrier according to the first embodiment of the present invention.

Referring further to FIG. 7, after the key is inserted and rotated in the locking orifice 553, the affixing member 55 is driven by the key, and the first engagement portion 531 contacts with the second engagement portion 551. After removing the key from the locking orifice 553, the fixing mount 53 is locked securely so that the pawl wheel 42 engages with the toothed portion 54.

Figure 8:
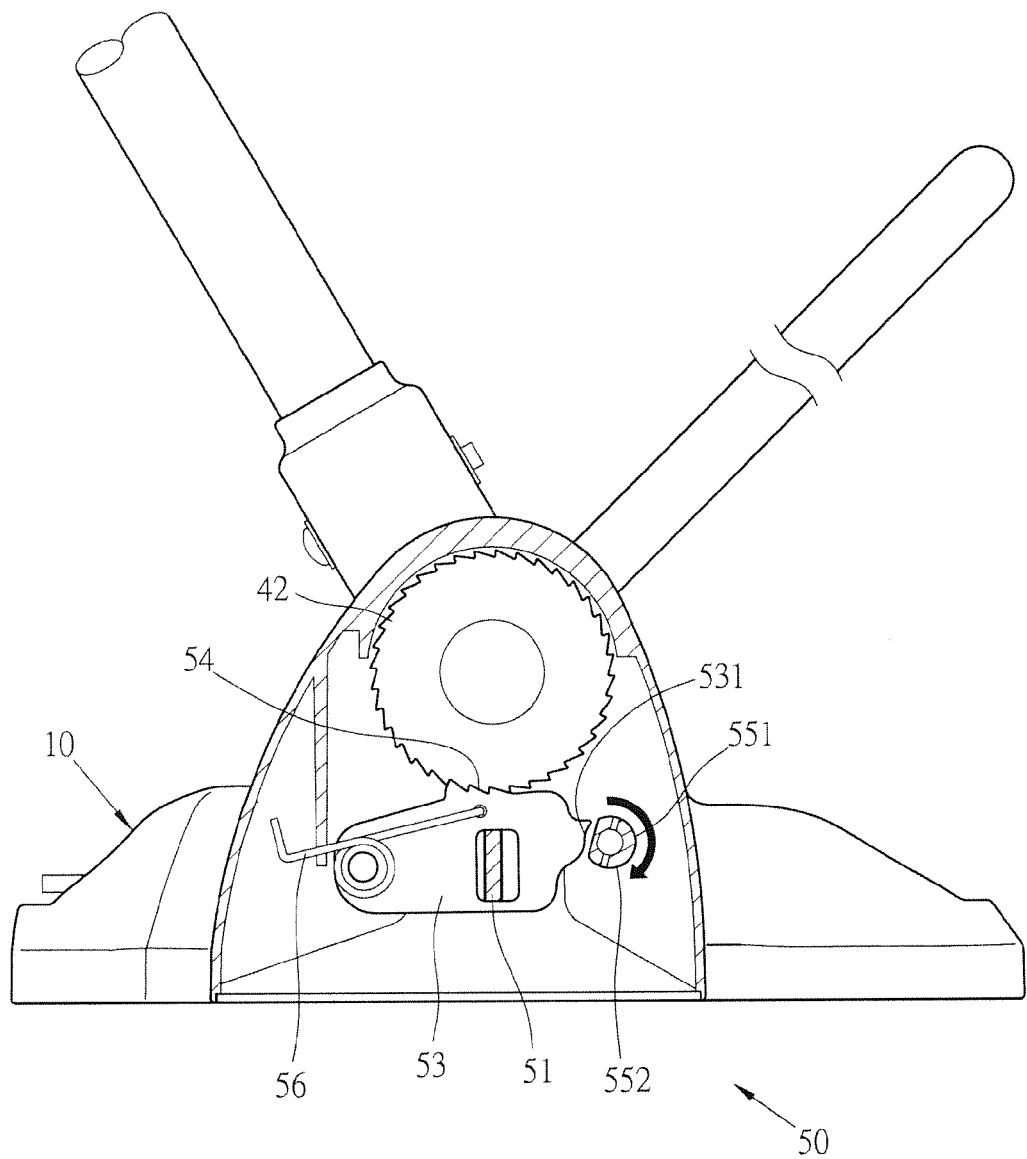
FIG. 8 is still another cross sectional view showing the operation of the adjustable bicycle carrier according to the first embodiment of the present invention.
Figure 9:
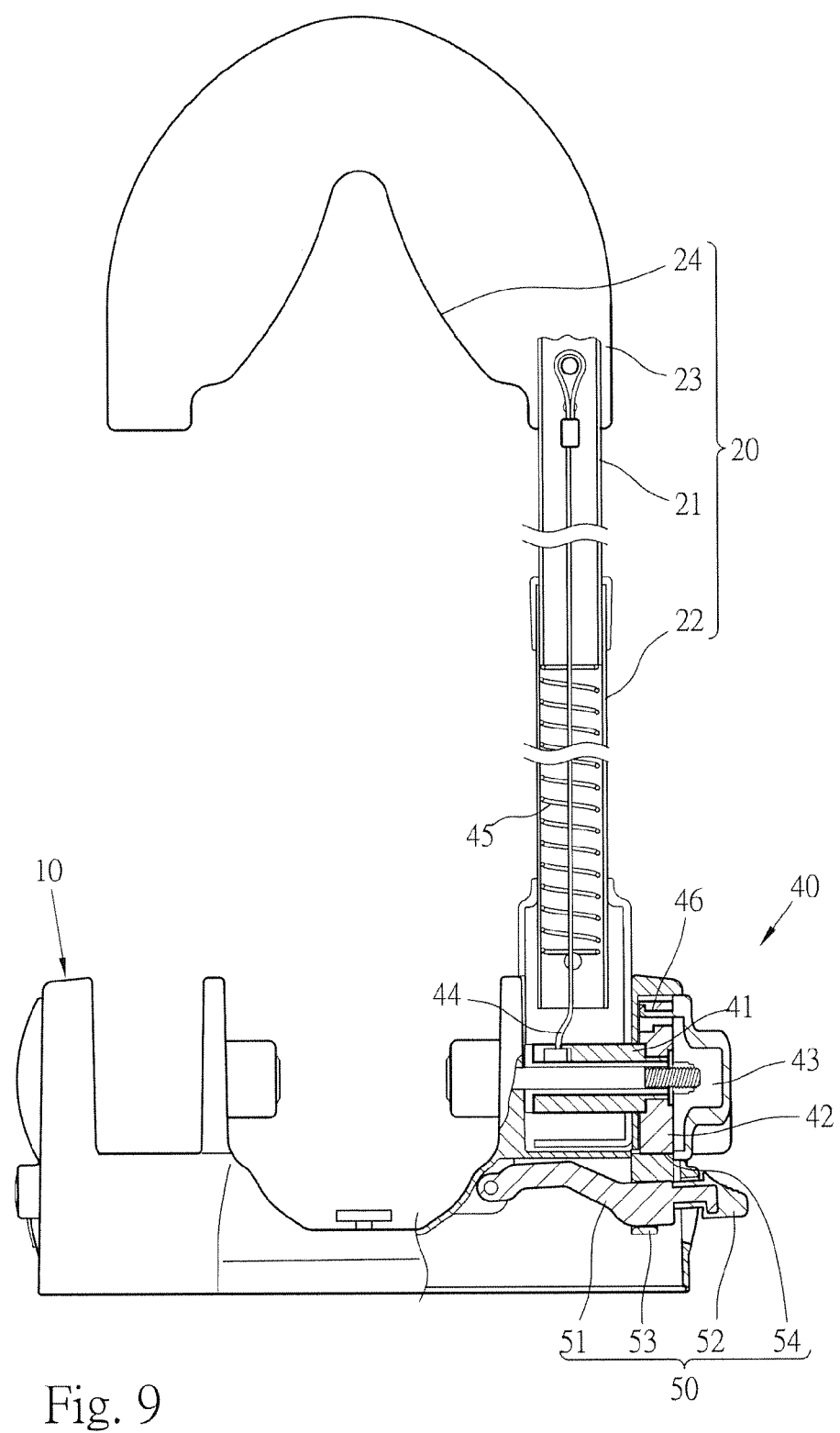
FIG. 9 is a cross sectional view showing the assembly of an adjustable bicycle carrier according to a second embodiment of the present invention.

As intending to remove the bicycle from the adjustable bicycle carrier, as illustrated in FIG. 8, the key is inserted and rotated in the locking orifice 553 so as to drive the affixing member 55, meanwhile, the unlock portion 552 corresponds to the first engagement portion 531, and a clearance between the unlock portion 552 and the first engagement portion 531 generates, thus releasing a locking state. The second resilient element 56 abuts against the fixing mount 53 upwardly so that the pawl wheel 42 keeps engaging with the toothed portion 54, the inner rod 21 does not resiliently extend outward.

Thereafter, the bicycle frame is held with one hand, and the positioning block 52 is rotated downwardly so that the pawl wheel 42 does not engage with the toothed portion 54, hence the pawl wheel 42, the rotatable adjustment knob 43 and the rotating member 41 are not engaged, and the first resilient element 45 pushes the inner rod 21 to move outwardly and pulls the steel cable 44 to unroll from the rotating member 41, such that the pawl wheel 42, the rotatable adjustment knob 43 and the rotating member 41 rotate simultaneously until the elasticity of the first resilient element 45 is zero, and then the lock groove 24 unlocks each bicycle wheel 60, thereby removing the bicycle.

The ratchet mechanism arranged between the rotatable adjusting device 40 and the locking device 50 is applied to rotate the rotatable adjustment knob 43 with one hand so as to adjust the length and a height of the first mounting rack 20, thus avoiding danger during automatic rotation.

The second resilient element 56 abuts against the fixing mount 53 upwardly so that the pawl wheel 42 keeps engaging with the toothed portion 54, such that the inner rod 21 does not resiliently extend outward in an accident rotation and maintains positioning each bicycle wheel 60 fixedly, thus obtaining locking stability and safety.

The positioning block 52 of the locking device 50 moves linearly to drive the swing arm 51 to swing synchronously, and the fixing mount 53 moves so that the toothed portion 54 disengages from the pawl wheel 42, hence the first mounting rack 20 is extended to remove each bicycle wheel 60, thereby achieving operating convenience.

The rotatable adjusting device 40 is fixed on the connecting position of the base 10 adjacent to the roof of the automobile, so a user can touch and operate the adjustable bicycle carrier easily by adjusting the height of the first mounting rack 20.

The affixing member 55 of the locking device 50 is driven by rotating the key so that the second engagement portion 551 and the unlock portion 552 correspond to the first engagement portion 531 to form the locking state or an unlocking state. When the adjustable bicycle carrier is in the locking state, the first engagement portion 531 contacts with the second engagement portion 551 so that the fixing mount 53 is fixed, and the pawl wheel 42 engages with the toothed portion 54 to position the inner rod 21, thereby avoiding each bicycle wheel remove from the lock groove 24.

With reference to FIG. 5, a difference of an adjustable bicycle carrier of a second embodiment from that of the first embodiment comprises: a first mounting rack 20, a rotatable adjusting device 40, and a locking device 50 which are connected with a right side of the base 10.

Thereby, the adjustable bicycle carrier allows adjusting a fixing height of the bicycle on the adjustable bicycle carrier, wherein the adjustable bicycle carrier is fixed on the roof of the automobile and is served to lock each bicycle wheel by ways of the ratchet mechanism. The ratchet mechanism is arranged between the rotatable adjusting device and the locking device so as to achieve a driving operation in a first rotating direction and an engaging operation in a second rotating direction with one hand, such that the height of the first mounting rack is adjusted. Furthermore, the second resilient element abuts against the fixing mount upwardly so that the pawl wheel keeps engaging with the toothed portion, and the inner rod does not resiliently extend outward to remove each bicycle wheel. The rotatable adjusting device is fixed on the base adjacent to the roof of the automobile, so the user can touch and operate the adjustable bicycle carrier easily by adjusting the height of the first mounting rack. Preferably, the affixing member is fixed securely by contacting the first engagement portion with the second engagement portion, thereby enhancing locking stability of the adjustable bicycle carrier.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An adjustable bicycle carrier comprising:
a base being a housing;
a first mounting rack rotatably connected with the base and including an inner rod and an outer rod, the inner rod linearly moving in the outer rod and having a retaining seat mounted on a free end thereof and locking a first portion of each of two bicycle wheels;
a rotatable adjusting device fixed on a connecting position of the base and the first mounting rack and including a rotating member coaxially joining with the rotatable adjusting device, the rotatable adjusting device also including a pawl wheel fitted on one end thereof and synchronously rotating with the rotating member, a rotatable adjustment knob partially extending out of the base and synchronously rotating with the pawl wheel and the rotating member, a steel cable and a first resilient element which are secured in the inner rod and the outer rod, wherein the steel cable has a first end disposed on a predetermined position of an inner peripheral side of the inner rod and a second end mounted on the rotating member, such that the second end of the steel cable rolls on the rotating member and pulls the inner rod linearly to move to the outer rod when the rotating member rotates, the first resilient element is provided to drive the inner rod to move back to an original position after the inner rod linearly moves to the outer rod;
a locking device including a swing arm, and a first end of the swing arm rotatably connecting with a first predetermined position of an inner rim of the base, and a second end of the swing arm coupling with a positioning block, the swing arm having a fixing mount secured on a predetermined portion thereof, wherein the positioning block and the fixing mount simultaneously swing with the swing arm, the fixing mount has a teeth portion for engaging with the pawl wheel, such that when the swing arm swings, the pawl wheel engages with or disengages from the toothed portion.

2. The adjustable bicycle carrier as claimed in claim 1, wherein between the pawl wheel and the rotatable adjustment knob is defined a retaining set, and the retaining set has a first engaging portion fixed on the rotatable adjustment knob and a second engaging portion secured on the pawl wheel so as to retain with the first engaging portion.

3. The adjustable bicycle carrier as claimed in claim 2, wherein the first engaging portion has a flange formed in an inverted hook shape; and the second engaging portion is recessed.

4. The adjustable bicycle carrier as claimed in claim 1, wherein the inner rod and the outer rod of the first mounting rack are fitted together so as to form a U-shape first mounting rack.

5. The adjustable bicycle carrier as claimed in claim 1, wherein a predetermined portion of a first side of the fixing mount rotatably joins with the inner rim of the base, such that the fixing mount simultaneously swings when the positioning block linearly moves; the fixing mount has a first engagement portion arranged on a second side thereof; the locking device further includes an affixing member rotatably connected on a second predetermined position of the inner rim of the base and rotatably moving; a second engagement portion disposed on a first predetermined position of an outer rim of the affixing member and engaging with the first engagement portion.

6. The adjustable bicycle carrier as claimed in claim 5, wherein the affixing member has an unlocking portion mounted at a second predetermined position of the outer rim thereof relative to the second engagement portion, such that between the second engagement portion and the first engagement portion is defined a gap; a locking orifice exposes outside the base so as to insert a key, such that the key is rotated in the locking orifice so as to drive the affixing member to rotate.

7. The adjustable bicycle carrier as claimed in claim 6, wherein the unlock portion is a flat surface formed by an outer-diameter tangent plane of a circular column of the affixing member.

8. The adjustable bicycle carrier as claimed in claim 5, wherein the locking device further includes a second resilient element defined between a third predetermined position of the inner rim of the base and the fixing mount, such that the fixing mount is driven by the second resilient element to return back to an original position after swinging, and the pawl wheel engages with the toothed portion.

9. The adjustable bicycle carrier as claimed in claim 1 further comprising a second mounting rack formed in a U shape and coupled with the base so as to rotate at a preset angle and to lock a second portion of the bicycle wheel.

10. The adjustable bicycle carrier as claimed in claim 1, wherein the second mounting rack and the first mounting rack are coaxial and connected with the base.

11. The adjustable bicycle carrier as claimed in claim 1, wherein the retaining seat has a V-shaped lock groove defined thereon so as to lock the first portion of each of the two bicycle wheels.

* * * * *